Jan. 7, 1936.  H. W. THOMPSON ET AL  2,026,714
APPARATUS FOR HYDROLIZING ACID SLUDGE
Original Filed May 27, 1930
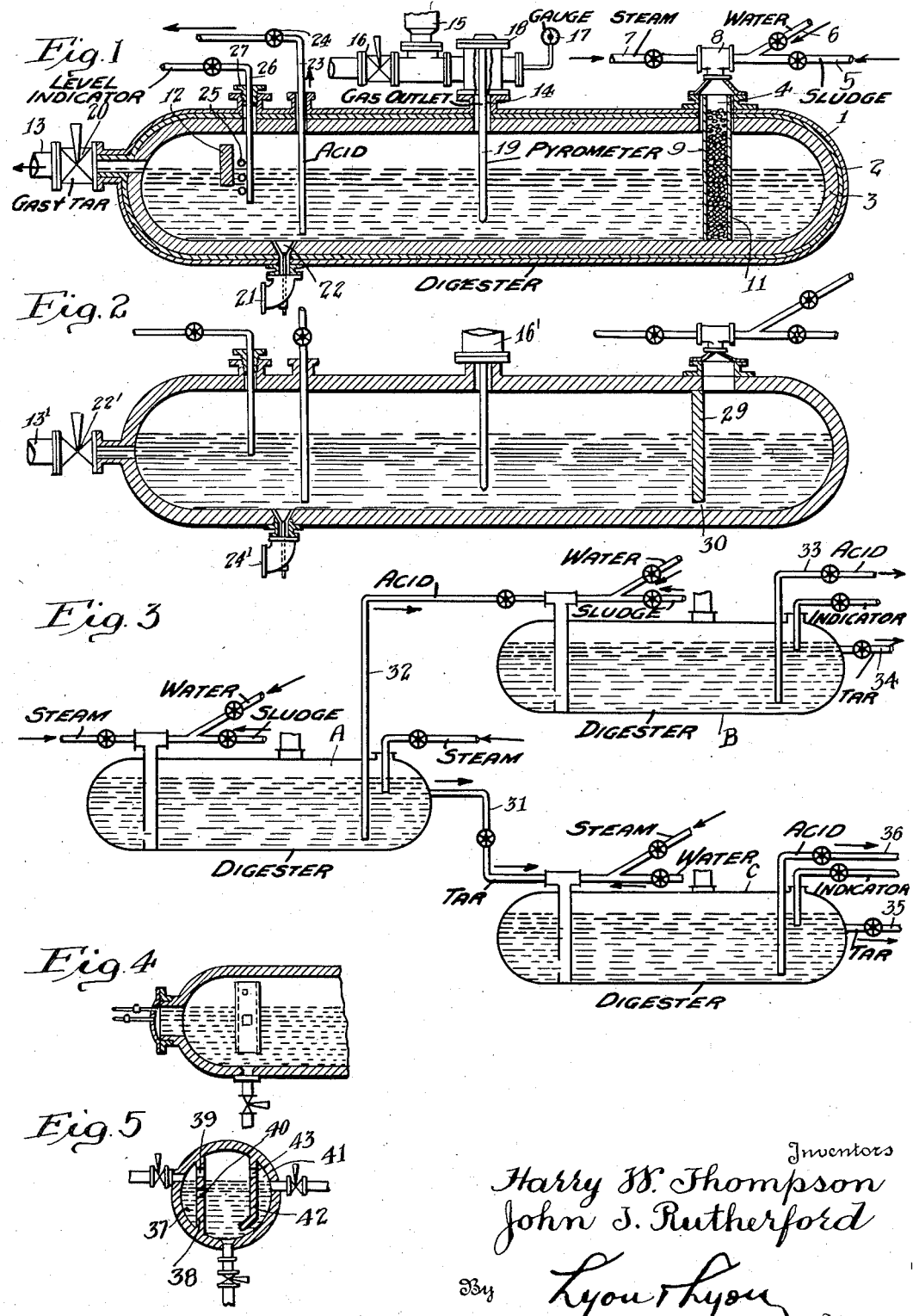

Patented Jan. 7, 1936

2,026,714

UNITED STATES PATENT OFFICE 2,026,714

APPARATUS FOR HYDROLIZING ACID SLUDGE

Harry W. Thompson and John T. Rutherford, Berkeley, Calif., assignors to Standard Oil Company of California, San Francisco, Calif., a corporation of Delaware Original application May 27, 1930, Serial No. 455,999. Divided and this application January 13, 1933, Serial No. 651,491

5 Claims. (Cl. 23—290)

This invention relates to improvements in apparatus for hydrolyzing acid sludge of the type produced by the reaction of sulphuric acid with hydrocarbon oils. This application is a division of our co-pending application Serial No. 455,999, filed May 27, 1930.

In the treatment of hydrocarbon oils, such as petroleum oils, shale oils, coal tars and the like, with sulphuric acid, there is formed an acid sludge which contains a heavy reaction product of the oil and acid together with some intermingled but uncombined acid and oil. It is customary to recover as much of the acid and oil (both combined and uncombined) as possible, the usual procedure being to heat the sludge with water to hydrolyze it into weak acid and acid oil or tar. The hydrolyzing process may be performed at atmospheric pressures or at superatmospheric pressures, the latter being preferable because the higher pressures permit the use of high temperatures which result in quicker and more complete separation of the acid and oil. It has been the practice to use both batch and continuous methods of operation, the latter being preferable because of the greater daily capacity of the plant.

The prior methods of hydrolyzing sludge at superatmospheric pressures and high temperatures have certain limitations and disadvantages which it is the object of the present invention to overcome. For instance, the temperatures employed in the prior methods have been for some sludges either too low to produce a clean acid free from oil, or have been so high as to form coke in the digester. The difficulty is due to the fact that the temperatures required for separation of oil from acid, for some sludges, are higher than the temperatures at which the oils are coked. While both of these disadvantages are serious, the worst is the formation of coke because it necessitates shutting down the plant from time to time in order to clean out the digester.

It is the general object of the present invention to provide an apparatus for hydrolyzing acid sludge which will effect a more complete separation of the acid and tar than the processes which have heretofore been used.

More specifically, it is an object of the present invention to provide an apparatus for hydrolyzing acid sludge which will permit the use of higher temperatures without causing the tar formed in the apparatus to become too viscous for use as liquid fuel, and to provide an apparatus which is safer and more reliable in operation and which can be employed to produce a stronger acid with the formation of less coke than those which have heretofore been employed.

Another object of the present invention is to provide an apparatus for hydrolyzing sludge in which the tar formed by the process and apparatus may be readily removed from the interface between the acid and tar.

Another object of the present invention is to provide an apparatus for hydrolyzing tar with an inverted weir or baffle arranged to permit the withdrawal of tar from the interface between the acid and tar in the vessel and to provide an adjustment for the syphon which will permit the height of the acid in the vessel to be readily regulated.

A further object of the present invention is to provide a syphon for withdrawing acid from an apparatus for hydrolyzing acid sludge in which the corrosion and deposition of coke in the syphon is avoided.

Another object of the present invention is to provide an apparatus for hydrolyzing acid sludge in which the mixing of the acid and water or steam to be hydrolyzed may be appreciably carried out without agitating or securing turbulence in the digesting operation or the digester, to the end that the acid and tar which are produced may be more readily and completely separated.

Another object of the present invention is to provide an apparatus for hydrolyzing certain difficultly hydrolyzable sludges. We have discovered that certain sludges have a more pronounced tendency to produce coke than others and that it is extremely difficult to properly hydrolyze the same separately, but that when these sludges are mixed with certain other more easily hydrolyzable sludges, the mixture may be readily processed.

Another object of the present invention is to provide an apparatus for hydrolyzing acid sludge in which a more complete hydrolyzation of the components is effected by separating partially hydrolyzed tar and partially hydrolyzed acid from each other and subjecting one or both of the same to further digestion.

A further object of the present invention is to provide an apparatus for hydrolyzing acid sludge in which the heat of reaction can be retained within the hydrolyzing chamber by the use of a brick lining, of a material adapted also to operate to reduce the corrosive action of the acid on the apparatus.

It has been found that in the process of hydrolyzation the temperature of the acid body in the retort has a decided effect upon the quality of the acid produced, the higher the temperature the cleaner the acid will be. In other words, higher temperatures result in a more complete separation of tar and acid. Unfortunately, the high temperatures in the tar body increase the viscosity of the tar, thus impairing its value as a fuel. It has also been found that by reducing the quantity of the tar held in the vessel, the adverse effect of higher temperature will be offset by the consequent decrease in throughput time of the tar.

It has been found, also, that with those sludges which form coke at temperatures below the temperature at which the acid and tar readily separate, the formation of the coke occurs at or near the interface between the acid and tar layers in the digester. This layer of coke builds up, in the prior processes, until it becomes necessary to shut down the digester to clean out the coke. It has been found that the coke can be removed from the digester as rapidly as it is formed, without removing the remainder of the tar, which is left in the digester for more complete removal of the acid.

It has been found, also, that the hydrolyzing vessels which have been used heretofore are unsafe in that the acid draw-off valves are placed below the acid level, with the result that a failure of the acid draw-off valve results in the discharge of a part or all of the contents of the vessel.

Various further objects and advantages of the present invention will be understood from the description of a preferred form or example of an apparatus embodying the invention. For this purpose, we have hereafter described, with reference to the accompanying drawing, a preferred form or forms of an apparatus embodying this invention.

In the drawing:

Figure 1 is an elevation mainly in vertical section of an apparatus embodying the invention.

Figure 2 is an elevation mainly in vertical section of a modified form of the apparatus.

Figure 3 is a diagrammatic elevation of the apparatus as it is arranged for subjecting separate tar and acid in a series continuous manner in a further digestion.

Figure 4 is a fragmentary elevation of a modification of the baffle and acid and tar draw-off lines which may be employed.

Figure 5 is another modification of the baffle acid and tar draw-off lines which may be employed.

Referring to the drawing, the apparatus there illustrated comprises a digester having an outer shell 1, preferably made of iron or steel lined with an acid resisting metal 2, such as lead, and having a facing of acid proof brick 3, or the like. The digester is provided with an inlet 4 for sludge from a pipe 5, water from a pipe 6, and steam from pipes 7. These pipes are preferably made of brass or other acid resisting material. The inlet pipes are connected to the digester by means of a suitable fitting, such as the T 8, which should be lined with lead or other acid-proof material. The digester may be covered with a heat insulating coating, such as asbestos, silocell or the like, although the brick facing 3 (which may be a double course) affords sufficient insulation for all practical purposes.

The mixture of the sludge, water and steam may discharge directly into the digester, but it is preferred to discharge it in such a manner as to minimize the turbulence of flow. Turbulent flow interferes with stratification of the separated acid and tar, making it difficult to separate them before withdrawal from the digester. Various means may be employed to reduce turbulence. In Figure 1 the means comprises a mixing chamber in the form of a stand pipe 9 connected at its top with the inlet 4, which is near one end of the digester and extending downwardly to the bottom of the digester. A discharge opening 11 is provided near the lower end of the mixing chamber, preferably facing the nearer end of the digester. The mixing chamber may or may not be filled with a suitable packing, such as broken brick, glass, quartz, pottery, etc. The digester may be provided with a mixed outside of the digester, or the mixer may take other forms, such as that shown in Figure 2.

The sludge mixture entering the digester from the mixing chamber 9 begins to separate into two layers, the upper layer being tar or acid oil, as it is sometimes called, and the lower layer being acid. It has been found that if the sludge is of a type which forms coke at the temperature of separation of acid and tar, the coke begins to collect at the interface between the acid and tar layers. Suitable means are provided for removing the coke, as it collects at the interface. In Figure 1, this means comprises a truncated baffle or inverted weir 12 extending across the end of the digester opposite to the inlet end. The baffle may take many forms, but the purpose of baffle is to serve as an inverted weir which will permit the lower stratum of the tar layer to flow under the baffle, while holding back the upper strata of tar.

The baffle may extend from the top to the bottom of the digester, in which case an opening must be provided at the interface of the acid and tar to permit the tar and coke to flow beyond the baffle. Another opening may be provided near the top of the baffle to equalize the pressure on both sides of the baffle. The baffle does not have to be constructed across the end of the digester, as shown in Figure 1, but may comprise the entrance to a draw-off chamber at the side of the digester. Numerous other constructions are also possible.

In Figure 1, the digester is provided with a tar outlet 13 communicating with the interior of the digester in back of the baffle 12. The outlet 13 is only partially submerged and, therefore, provides an outlet for the gas, as well as the tar. If the baffle 12 were extended upwardly to the top of the digester, thus cutting off the escape of the gas through the outlet 13, it would be necessary to provide a separate gas outlet. In some instances, it may be desirable to provide a separate outlet, even with the truncated baffle shown in Figure 1.

One such gas outlet is indicated at 14. The outlet is provided with a safety pressure relief valve 15 and an emergency gas release valve 16. A pressure gage 17 may be connected to the outlet as by the use of suitable pipe connections, such as the 4-way connection 18. The top of the 4-way connection may be provided with means for receiving a pyrometer 19 for recording the temperature of the content of the retort.

It is essential that the interface between the tar and acid be maintained at a substantially constant level just below the bottom of the baffle 12. This is accomplished by regulation of the rate of withdrawal of the acid and tar. A valve 20 on the tar outlet controls the tar withdrawal. The acid may be discharged in any manner, as by means of the draw-off line 21 and valve 22 at the bottom of the digester. We prefer, however, to withdraw the acid by means of a syphon 23 controlled by a valve 24. The use of a syphon eliminates the hazard of unexpectedly discharging the digester through failure of bottom discharge lines 21 or valves 22. The acid syphon line 23 may enter the digester at any point, but preferably above the normal acid level. The intake end of the acid line is preferably adjacent the bottom of the digester in order to pick up the cleanest acid which is always to be found at the bottom of the digester.

The acid syphon may be of any type, such as the well-known brick baffle type, or that shown in the drawing. We find that the brick baffle syphon gives considerable trouble because of the accumulation of coke in the syphon, due partly to the low velocity of the acid through the syphon, and partly to the tendency of the coke to adhere to the brick. The accumulation of coke not only plugs the brick syphon, but warps it to such an extent that leaks develop through which dirty acid, high in the digester, can seep into the syphon and escape through the clean acid outlet.

We have found that it is advantageous to employ a syphon pipe made of a suitable acid resisting metal, such as a lead alloy containing about 5% of antimony. The high antimony lead will resist erosion as well as corrosion. The cross-sectional area of the pipe can be made small enough to provide high velocities which hinder the deposition of coke. Furthermore, coke does not adhere readily to the lead-antimony alloy.

Suitable means are provided for indicating to the operator the liquor levels in the digester. Such means may comprise a series of vertically spaced try-cocks 25 or a vertically movable discharge pipe 26 passing through a stuffing box 27 in the top of the digester. The line 26 may be provided with a series of marks or graduations indicating the distance which the pipe is inserted into the digester.

Figure 2 shows a digester which may be used in place of that shown in Figure 1. The principal difference in detail is in the method of drawing off the tar and coke. The acid-tar interface is maintained at the level of the tar draw-off 13¹, no baffle being necessary. Proper adjustment of the acid and tar draw-off valves 24¹ and 22¹ will cause the acid-tar interface to maintain the desired level.

It will be observed that since the tar outlet 13' is submerged below the tar layer it will not be possible for the gas to escape through the tar draw-off, as in Figure 1. The gas may be drawn off through the valve 16¹ or a separate pipe and valve may be provided. The mixing chamber in Figure 2 is somewhat different from Figure 1, being formed by means of a baffle 29 extending across the digester from the top almost to the bottom, leaving a passage 30 at the bottom. The mixing chamber may or may not be packed with brick, tile, etc.

Figures 4 and 5 show a special arrangement of baffle and tar and acid outlets. At one side of the digester is a chamber 37 formed between the wall of the digester and a partition 38 having two vertically spaced ports 39 and 40. The acid-tar level in the digester is maintained at the lower port 40, permitting the tar to pass into the chamber 37 and thence out of the digester through the draw-off line. The port 39 permits equalization of the gas pressure in chamber 37 and the digester. Opposite to the tar chamber 37 is an acid chamber 41 formed between the wall of the digester and a partition 42. Acid from the lower portion of the digester enters the chamber 41 through an opening at the bottom thereof, and passes out of the digester through the acid discharge line. A pressure equalizing port 43 is provided in the partition 42 near the top thereof.

Figure 3 shows what has been termed a "series continuous" digesting system. The digesters A, B and C are similar to those shown in Figures 1 or 2. Sludge, steam and water are fed into digester A, from which the tar is fed through line 31 into digester C and the acid is fed through line 32 into digester B. The digesters A and B may be used without digester C, or digesters A and C may be used without digester B. The digester B yields principally acid (through pipe 33) with a small amount of tar (through pipe 34), while the digester C yields principally tar (through pipe 35) with a small amount of acid (through pipe 36).

The operation of the digesters, shown in Figures 1 and 2 is as follows:

Steam is admitted into the digester until the desired pressure is obtained. Sludge and water are then continuously charged into the digester in suitably regulated volumes. The sludge, water and steam are preferably passed through a mixer before being discharged into the digester at one end thereof. The sludge begins to hydrolize at once, separating into two layers, the tar floating on top of the acid layer. The tar and acid are drawn off at the end of the digester opposite the sludge inlet.

A single outlet for the tar and acid might be used, but separate outlets are prefered since some tars and acids tend to emulsify if discharged in an intermingled condition.

The flow rate of sludge, water and steam may be determined by any suitable means, such as recording orifice meters or by gaging the supply tanks from time to time. Pressure is maintained by controlling the acid and tar valves.

The yields and quality of tar and acid obtained by pressure digesting are controlled by the following factors:

1. Temperature (and pressure) in the digester
2. Sludge feed rate
3. Water—sludge ratio
4. Tar and acid time in the digester
5. Age of the sludge (with certain sludges)
6. Properties of the sludge The first five of the foregoing variables can be changed at will, within the limiting conditions for the apparatus, but the sixth variable can not be controlled by the operator, except that where a given type of sludge may not be hydrolyzed into suitable acid and tar it may be mixed with other types of sludge to produce a suitable mixture which will yield satisfactory tar and acid.

The temperature in the digester is perhaps the most important variable. Low temperatures result in slow and incomplete separation of acid and tar, poor yields of acid and tar, high acidity in the tar and high carbon content in the acid. High temperatures, above the boiling point of the sludge-acid-tar mixture, result in rapid and substantially complete separation of acid and tar, improved yields of acid and tar, low acidity in the tar and a low carbon content of the acid. In order to reach the desired high temperatures pressure is employed. The pressure may vary anywhere from just above atmospheric pressure to 100 lbs., gage, or more. The temperatures corresponding to these pressures are from 225° F. to 400° F. With most sludges the preferred temperatures are between 275° F. and 340° F. with corresponding pressures of 15 lbs. to 70 lbs. gage. Higher temperatures increase the yield of acid and decrease the carbon content of the acid, but have the disadvantage of increasing the viscosity of the tar (thus impairing its usefulness as a fuel), and cause the formation of coke in the digester. Coke formation is a serious difficulty, particularly with some sludges which tend to coke at temperatures close to their hydrolyzing temperatures. The proper temperature-pressure relation for any given sludge can be readily determined by experiment. The steam rate to the digester sufficient to maintain a temperature of 300–400° F. is about 2.5 lbs. of steam per gallon of sludge, the steam being at 90 lbs. per square inch gage pressure and containing 2% moisture.

The sludge feed rate affects the carbon content of the acid and the viscosity of the tar. A decrease in the sludge rate will reduce the carbon content of the acid by allowing the acid to remain at the hydrolyzing temperature for a longer period; however, the viscosity of the tar will be increased because of a greater polymerization thereof. (See, also, the following discussion of the tar and acid time in the digester.) With a digester of the type shown in the drawings having a diameter of 5 feet and a length of 30 feet, a sludge rate of approximately 1600 gallons per hour has been found satisfactory.

The water-sludge ratio affects primarily the strength of the acid produced by the digester. It has been found that a water rate to produce 45° Bé. acid is most satisfactory for most sludges. Water rates producing an acid of higher strength will decrease the yield of acid since under these conditions the sludge will not be completely hydrolyzed. Excessive water rates producing acid weaker than 45° Bé. do not affect the acid yield, but are detrimental in that additional concentration is necessary for the recovery of usable acid. With a sludge rate of 1600 gals. per hour a water rate of 300 to 1000 gallons per hour or 14 gallons per barrel of sludge will be found satisfactory, the exact amount of water being regulated to produce an acid of 45° Bé.

The periods of time for the tar and acid in the digester can be varied to offset the effects of temperature and sludge rates on the properties of the tar and acid produced. The periods of time which the acid and tar are retained in the digester are determined by the relative volumes of acid and tar and the sludge rate. The acid-tar volumes are controlled by the acid-tar level which can be raised or lowered at will, as will be hereinafter more fully explained. A decrease in the tar time in the digester will decrease the viscosity of the tar allowing higher hydrolyzing temperature without the production of a high viscosity tar. By increasing the acid time in the retort the hydrolysis is more complete and the carbon content will be reduced. At temperatures around 300° F. (depending upon the character of the sludge) the tar should not be kept in the digester more than about half an hour, while the acid should be kept in the digester about two hours or two and one-half hours.

The age of the sludge is important with certain sludges, such, for example, as are produced by low temperature acid treatments. It has been found that if these "cold-treating" sludges are stored in the usual manner before being processed for recovery of acid and tar, a reaction sets in as the sludge warms up to atmospheric temperatures, with the evolution of sulphur dioxide gas. The sludge after reaction will give a lower acid yield, a more viscous tar and a higher carbon acid due to the polymerization of the sludge and the formation of more stable sulphur compounds during the reaction period. Generally speaking, " cold treating " sludges should be processed immediately.

The properties of the sludge will vary with the nature of the oil which is treated and the kind and amount of acid used in the treatment. It has been found that the sludges from liquid petrolatum, and lubricating oil produced from asphaltic base crude petroleum by the usual methods, can not be satisfactorily processed by themselves, but if mixed with other sludges, such as gasoline or lamp oil sludges, they can be readily processed. It has been found that suitable mixtures of these sludges comprise 25–50% of the difficultly processed sludges with 75–50% of the more easily processed sludges.

The specifications for a suitable acid for concentration produced by the apparatus are substantially as follows:

| | |
|---|---|
| Gravity (degrees Baumé) | 35–50° |
| Percent $H_2SO_4$ | 40–60% |
| Yield—lbs. of 55% $H_2SO_4$ acid per gallon of sludge | 6–14 lbs. |
| Percent carbon in acid | 1–3% |

The specifications for a suitable tar for use as a liquid fuel produced by the apparatus are substantially as follows:

| | |
|---|---|
| Acidity of tar, percent $H_2SO_4$ | 5–20% |
| Yield of tar, gallons per gallon of sludge | 0.3–0.7 gals. |
| Viscosity Saybolt at 210°F | 200–2000 seconds |
| B. t. u.'s per pound | 10,000–16,000 B. t. u. |

From the foregoing description of the apparatus, shown in Figures 1 and 2, the conditions controlling the character of the acid and tar produced by hydrolysis, a person skilled in the art will readily understand how to operate the apparatus to produce the desired results.

The apparatus thus described permits a more complete hydrolyzation of acid sludge without formation of excessive amounts of coke because the apparatus permits the tar and coke to be withdrawn from the interface between the acid and tar layers. By removing the coke from the digester as it is formed, the tar may be digested a longer period and the coke formed is more completely removed.

The utilization of the siphon for withdrawing acid permits the acid to be withdrawn from the bottom of the digester, securing the cleanest acid and hence insuring a more complete hydrolyzation of the withdrawn product. Furthermore, this is done by a means and method which is safe and reliable in operation. The use of the vertically adjustable siphon also facilitates the withdrawal of the tar from the interface between the acid and tar layer in the digester by rendering it more convenient to maintain. The discovery of the properties of lead antimony alloys to resist erosive as well as corrosive action permits the use of a siphon which is relatively free of corrosion and deposition of coke. It may also be pointed out that a feature of the invention resides in the provision of a relatively small diameter syphon capable of securing a sufficiently rapid flow of acid from the digesting chamber to carry along coke and maintain itself free.

The special means described herein for mixing the acid with the water and steam in the digester facilitates further the maintenance of an interface and the correct withdrawal of coke from such interface by eliminating the turbulence within the main digesting chamber.

Another feature of the present invention is the discovery that sludges produced by cold treatment of petroleum oils or sulphuric acids are most successfully hydrolyzed if they are treated before they have time to undergo secondary reactions. By "cold treated" sludges we refer to those sludges that are obtained by treating petroleum oils, especially motor fuels, with sulphuric acid while restraining rise of temperature of treatment sufficiently so that the acid dissolves components of the oil rather than polymerizes the same. Certain petroleum oils contain constituents such as sulphur bodies which when contacted with sulphuric acid in a normal manner are polymerized by the sulphuric acid to heavier or higher boiling point materials. When the temperature of treatment is kept sufficiently low, such as below normal, to a partial extent at least, this polymerizing reaction is inhibited and certain petroleum bodies are in place dissolved and are present in this condition in the acid sludge. If the acid sludge is then permitted to warm or stand, these dissolved constituents of the oil undergo a reaction with the acid sludge which decreases the total amount of sulphuric acid which can be obtained therefrom.

By "cold treated sludges" we refer in this application to sludges which contain constituents which are dissolved in sludge and are capable of reacting with the sludge at higher temperatures or over periods of time to form polymerized constituents.

Another feature of the present invention is the discovery that acid sludges which can be hydrolyzed only with difficulty can be readily hydrolyzed by mixing with them a large portion of easily hydrolyzable sludges.

While the digesting apparatus as described in connection with Figures 1 and 2 may be employed as a sole method and means of hydrolyzation, we have discovered that superior results produced are what we term a "series continuous" hydrolyzing apparatus.

Figure 3 diagrammatically illustrates such an apparatus. In Figure 3 the digesters A, B and C may be the same as either of those shown in Figures 1 or 2, or they may be of any other suitable type. A series continuous process embodies the feature of either double digesting acid or double digesting tar, or both. By the use of a series continuous apparatus the carbon content of the produced acid is reduced.

The extent of the carbon reduction depends upon the following variables:

1. The original digesting temperature
2. Length of time the acid is digested
3. Temperature of final digesting It has been found that an acid produced by digesting a sludge at a relatively low temperature can be substantially reduced in carbon content by re-digesting the acid at a higher temperature. If the first digestion is conducted at too high a temperature the second digestion will effect only a slight reduction in the carbon content of the acid. The temperature differential between the original and final digestion temperatures appears to be the greatest factor in carbon reduction. The retorting time has only a slight effect on the reduction of carbon in the acid. For instance, if the second digester is maintained at the same temperature as the first digester the carbon content of the acid can be reduced an adtional 15–20%; but if there is a large temperature differential between the two digesters, say 50° F., a carbon reduction of over 50% can be obtained. That is to say, the carbon content can be reduced (as has been done) from 3.15% in acid digested at 290° F. to 1.35% by redigesting the acid at 346° F., this being a reduction of 50.8%. It has been found that for most sludges the initial digesting temperature should be anywhere from 275° to 340° F. with final digesting temperature about 50° F. higher than the initial temperature. Large amounts of steam are required in order to raise the acid to the high hydrolyzing temperature, this steam having the disadvantage of diluting the acid and reducing its acidity.

It has been found that this disadvantage can be overcome by digesting the acid with a sludge. For example, a recovered acid having a carbon content of 5.34, a gravity of 36.6° Bé., and an $H_2SO_4$ content of 40.9% was re-digested with about three times its volume of sludge, with the result that the final recovered acid had a carbon content of only 1.65%, a gravity of 45.3° Bé., and an $H_2SO_4$ content of 54%. The initial acid was produced by digestion at 310° F., and the final acid was produced by digestion at 346° F.

Double digesting of tar is advantageous with some sludges, particularly those produced by the treatment of oils with recovered acid instead of fresh acid. When sludges of this type are digested there is produced an acid of about 45° Bé. and an emulsion of acid and tar. This emulsion cannot be readily broken if the acid relatively is strong. For this reason the emulsion does not break in the first digester, the acid strength therein being about 45° Bé. It has been found that the tar emulsion can be readily broken by steaming the emulsion in separate digester where the acid strength is reduced by the addition of water and steam. A typical example is as follows:

A sludge from the treatment of petroleum oil with recovered acid yields in the first digester 6.5 lbs. of 45° Bé. acid per gallon of sludge, and .72 gallon of tar-acid emulsion per gallon of sludge. The emulsion comprises weak acid and oil containing about 23% sulphuric acid. The tar-acid emulsion is passed from the first digester just before it begins to form coke at a temperature of about 290° F. and a pressure of 20 pounds per square inch, gage, to a second digester where it is again hydrolyzed with water and steam at a temperature of about 250° F. and a pressure of about 15 pounds per square inch. The products recovered from the second digester are a liquid tar and 2.5 lbs. of 34° Bé. acid per gallon of tar emulsion. The total yield of acid from the double digesting process is 9.0 lbs. of 42° Bé. acid per gallon of sludge, equivalent to 4.58 lbs. of 100% $H_2SO_4$ acid per gallon of sludge. The yield from a single digester operating at 340° F. would be about 11.5 lbs. of 34° Bé. acid per gallon of sludge, equivalent to 4.58 lbs. of 100% $H_2SO_4$ per gallon of sludge. While the yield of 100% $H_2SO_4$ is the same in both cases, the acid from the double digesting process is the more economical since it is the stronger acid, being 42° Bé. gravity as against 34° Bé. gravity from the single digester.

The acid might be more completely removed from the tar in the first digester by the use of a longer retorting time or the use of higher temperatures, but either of these expedients would, with some tars, cause coking. The use of additional steam or water might, under some conditions of temperature and pressure, give a more complete separation of acid and tar, but the total separated acid thus produced would be considerably weaker than the acid produced without the use of such steam or water.

Double digesting of the tar is advantageous not only for the production of stronger and cleaner acid, but also for the production of a lower viscosity tar. The second tar digester is held at a lower temperature than the first digester and a part of the volatile oil vapors from the first digester are condensed and absorbed by the tar, thus producing a tar of lower viscosity which increases its value as a liquid fuel.

Thus, it will be understood that in addition to the particular advantages of the present invention pointed out in connection with the apparatus shown in Figures 1 and 2 there are other advantages obtainable by use of the apparatus shown in Figure 3, namely, (1) the production of a stronger acid, (2) the production of a cleaner acid, that is, having a smaller carbon content, and (3) the production of a more fluid liquid fuel.

Although the apparatus illustrated in Figure 3 shows separate draw-off lines for the acid and tar from each digester, it should be understood that any or all of the digesters A, B and C may have but a single acid-tar draw-off, in which case the acid-tar mixture is discharged into a settling chamber where the acid and tar separate into two layers and may be withdrawn separately.

While the particular apparatus herein described is well adapted for carrying out the objects of this invention, it is to be understood that various modifications and changes may be made without departing from the spirit of the invention, and the invention is of the scope set forth in the following claims.

We claim:

1. An apparatus for hydrolyzing acid sludge, including a retort having a tar withdrawal means, and an inverted weir, between the tar withdrawal means and the main body of the retort, operative to permit the flow of a tar from substantially only the interface between the acid and tar layers within said retort to the tar withdrawal means, said inverted weir being disposed at least as high as approximately the center of said retort.

2. An apparatus for digesting acid sludge, which comprises a retort, a tar withdrawal means for said retort, means for withdrawing acid from the lower part of said retort, and a baffle between the main body of the retort and the tar withdrawal means operative to permit flow of tar from substantially only the interface between acid and tar layers within said retort to the tar withdrawal means, said baffle providing an underflow passage disposed at least as high as the approximate center of said retort.

3. An apparatus for digesting acid sludge, comprising a retort having means for introducing continuously acid sludge, water and steam, means for thoroughly mixing the same before discharge thereof into the main body of the retort, a tar withdrawal means, an acid withdrawal means, and baffle means between the tar withdrawal means and the main body of the retort so positioned as to permit flow of the tar to the tar withdrawal means at a point approximately at the interface between acid and tar layers within said retort, said baffle providing an underflow passage disposed at least as high as the approximate center of said retort.

4. An apparatus for hydrolyzing acid sludge, comprising a retort, a baffle dividing said retort into a main chamber and a minor chamber, said minor chamber communicating at its lower end with the main space in said retort and provided with mixing means, means for introducing acid sludge, water and steam to said minor chamber, means for withdrawing tar from said main chamber of said retort, and means for separately withdrawing acid from said main chamber of said retort.

5. An apparatus for digesting acid sludge, comprising a digester having a vertical mixing chamber communicating with the main body of the digester at its lower end, means for introducing acid sludge, water and steam into said mixing chamber, means for withdrawing acid from the lower part of the digester, means for withdrawing tar from the digester, and baffle means arranged between the tar withdrawal means and the main body of the retort positioned to permit the flow of tar to the tar withdrawal means from substantially only the interface between acid and tar layers within said retort, said baffle providing an underflow passage disposed at least as high as the approximate center of said retort.

HARRY W. THOMPSON.
JOHN T. RUTHERFORD.